June 19, 1962   G. L. PUNCHES   3,039,786
STEERING IDLER ARM SUPPORT
Filed Sept. 21, 1959
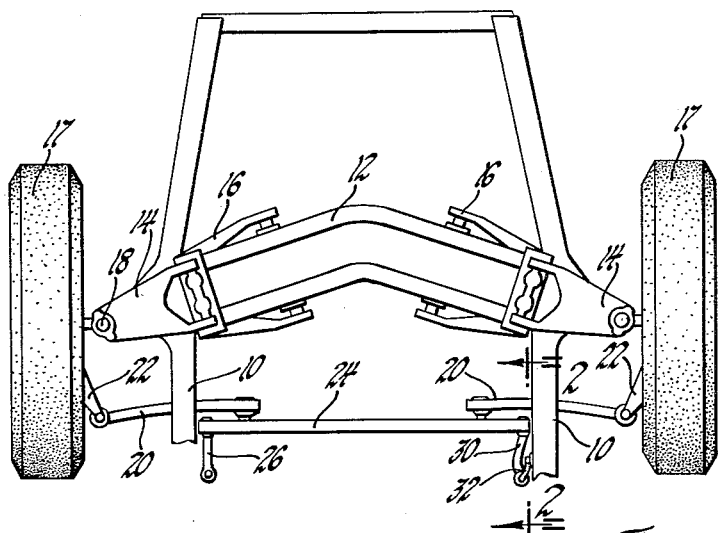
Fig. 1
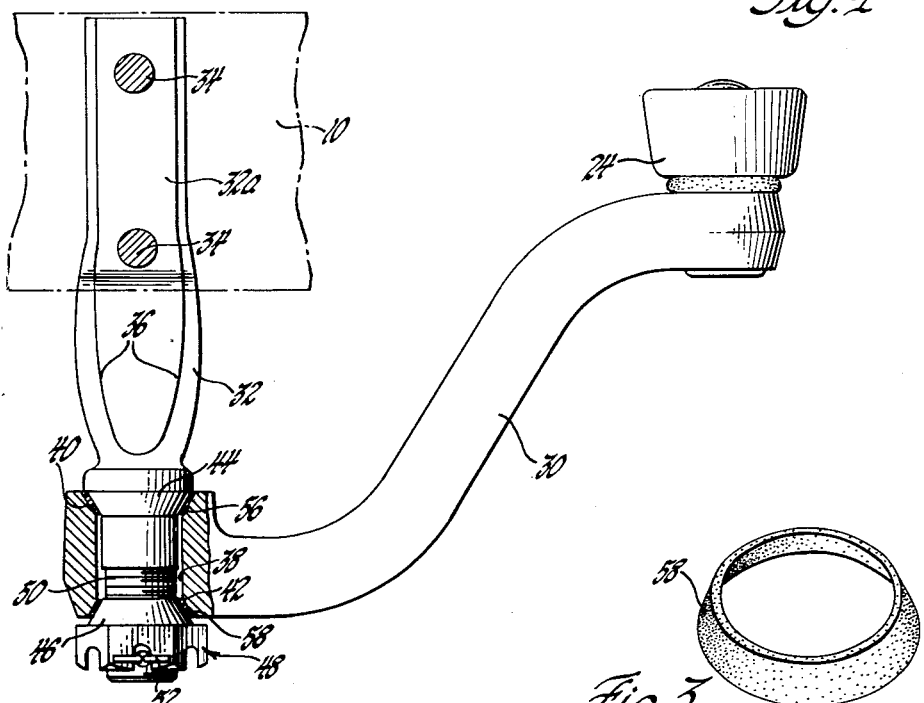
Fig. 2
Fig. 3
INVENTOR.
George L. Punches
BY
Bryce Beecher
ATTORNEY

United States Patent Office 3,039,786
Patented June 19, 1962

3,039,786
STEERING IDLER ARM SUPPORT
George L. Punches, Bridgeport, Mich., assignor to General Motors Corporation, Detroit, Mich., a corporation of Delaware
Filed Sept. 21, 1959, Ser. No. 841,333
1 Claim. (Cl. 280—95)

This invention relates to the steering of automotive vehicles, and more particularly concerns a support bearing for an idler arm such as used in association with a conventional parallelogram steering linkage.

At present, these bearings involve a threaded connection at the bearing surface, a condition giving rise to an undesirable "chuckle" in operation of the steering linkage. This chuckling noise is apparently caused by a free fit between the mating threads. At any rate, the noise is distracting and disturbing to many vehicle operators, and has occasioned complaints, not satisfied by the assurances of service people that the noise is "normal."

As suggested, the instant invention has as its principal object to provide at acceptable cost an idler arm support bearing which is virtually noiseless in operation. Other objects and features of the invention will be apparent from the following description of a preferred embodiment thereof. The description will proceed with reference to the accompanying drawings wherein:

FIGURE 1 is a plan view showing the front end portion of the chassis of a vehicle with the engine and accessory parts omitted;

FIGURE 2 is a view on the line 2—2 in FIGURE 1; and

FIGURE 3 is a detail of a bearing part.

Referring first to FIGURE 1, the numeral 10 denotes the side rail components of the vehicle frame. Interconnecting these side rails is a cross frame member 12 providing support for the upper and lower control arms 14 and 16, respectively, of the independent front suspension assemblies. The control arms 14 and 16 are interconnected at their outer ends by steering knuckle supports through which extend the king pins 18 about which the dirigible wheels 17 pivot.

Shown rearward of the suspension parts is a parallelogram steering linkage comprising tie rods 20 connecting at their outer ends through ball and socket joints with steering arms 22 and at their inner ends with a cross tie rod 24, sometimes called a "relay rod." At its left end, rod 24 is linked to a pitman arm 26 which as carried by the vehicle extends from the output shaft of the steering gear, not shown.

Rod 24, at its end opposite the pitman arm 26, is supported by an idler arm 30. This arm is bracketed to the frame of the vehicle through a member 32 (FIG. 2), the connection between such member and the arm being pivotal, as required. Member 32 is flatted at 32a to facilitate its affixation to the frame side rail 10 via bolts 34. Ridges 36 lend strength to the bracket.

The eyes 38 of the idler arm 30, provided in the interest of the connection between such arm and the bracket 32, will be noted formed as a cylinder with flared ends, the flaring being for the purpose of providing a pair of tapered seats 40 and 42 for the frusto-conical portion 44 of the bracket 32 and the frusto-conical portion 46 of a nut 48 carried by the threaded shank portion 50 of the bracket. Nut 48 is secured in place by cotter pin 52 accommodated in a slot in the nut and a hole in the threaded shank 50.

There will be seen interposed between the portion 44 of the bracket and between the portion 46 of the nut a tapered plastic bearing ring 56, 58 desirably formed of nylon or equivalent material not requiring periodic lubrication.

To make the bearing connection, the eye of the idler arm with the plastic bearing ring 56 in place on its seat is passed about the shank portion of the bracket to firmly seat the plastic ring against portion 44 of the bracket. Thereafter, nut 48 with plastic ring 58 carried thereon is threaded on the shank 50 of the bracket to an extent such that the ring snugly engages seat 42. With this accomplished, the nut is further threaded on the shank 50 to compress the plastic ring and to advance the nut slightly past the next cotter hole. Finally, the nut is backed off to the extent of such hole and the cotter pin inserted and spread.

I claim:

In an automotive vehicle, an assembly for supporting a steering linkage member, said assembly comprising: a bracket member fixedly connected to the frame of the vehicle, an arm member pivotally connected to said bracket member and to said steering linkage member, said arm at the point of its connection with said bracket member having an eye portion integral with the body of the arm, the eye being shaped generally as a cylinder flared at its ends to provide a pair of seats, said bracket member at said point having a frusto-conical portion accommodated on one of said seats and a threaded portion extending out the opposite end of said eye, a nut threaded on said threaded portion and having a frusto-conical portion accommodated on the other of said seats, a tapered, compressible plastic bearing ring of thin section interposed between each said seat and the corresponding frusto-conical portion and means preventing separation of said nut from said threaded portion.

References Cited in the file of this patent

UNITED STATES PATENTS

| | | |
|---|---|---|
| 994,007 | Kilgore | May 30, 1911 |
| 1,503,162 | James | July 29, 1924 |
| 2,544,582 | Booth | Mar. 6, 1951 |
| 2,809,049 | Carlson | Oct. 8, 1957 |
| 2,826,466 | Pritchard | Mar. 11, 1958 |
| 2,846,251 | Herbenar | Aug. 5, 1958 |
| 2,882,079 | Hoopes | Apr. 14, 1959 |
| 2,937,033 | Herbenar | May 17, 1960 |

FOREIGN PATENTS

| | | |
|---|---|---|
| 283,965 | Switzerland | July 5, 1950 |